United States Patent [19]

Smoot

[11] Patent Number: 4,937,443

[45] Date of Patent: Jun. 26, 1990

[54] PHOTOELECTRIC AMBIENT LIGHT SWITCH WITH AMBIENT LIGHT SENSING MEANS

[75] Inventor: George W. Smoot, Lake Worth, Fla.

[73] Assignee: Motorola, Inc., Schaumburg, Ill.

[21] Appl. No.: 386,176

[22] Filed: Jul. 28, 1989

[51] Int. Cl.$^5$ .............................................. G01V 9/04
[52] U.S. Cl. .............................. 250/221; 250/214 AL; 341/31
[58] Field of Search ................ 250/221, 229, 214 AL; 341/31

[56] References Cited

U.S. PATENT DOCUMENTS

| | | | |
|---|---|---|---|
| 3,885,408 | 5/1975 | Clark, Jr. | 250/221 |
| 3,901,813 | 8/1975 | Potopinski | 250/214 AL |
| 4,329,581 | 5/1982 | Helfrich, Jr. | 250/221 |

Primary Examiner—David C. Nelms
Assistant Examiner—Sherrie Hsia
Attorney, Agent, or Firm—Vincent B. Ingrassia; Anthony J. Sarli, Jr.

[57] ABSTRACT

A switching system operated from switching areas in a housing of an electronic device includes first and second sets of ambient light sensors and switch sensing means secured in the housing. An ambient sensing circuit and averaging circuit means connects to the first set of light sensors to produce a reference signal representing an average ambient light reaching the first set. A shielding sensing circuit means couples to the second set of light sensors to produce a switch sensing signal in response to an operator shielding ambient light therefrom. A comparison means coupled to the averaging and shielding sensing signal and the reference signal to provide an output after a predetermined delay; and a switch connected to said comparison means performs at least one switching function in response to the output from the comparison means.

18 Claims, 4 Drawing Sheets

PHOTOELECTRIC AMBIENT LIGHT SWITCH WITH AMBIENT LIGHT SENSING MEANS

BACKGROUND OF THE INVENTION

The present invention relates to manually operated switches, and more particularly to a sealed, ambient light operated switching system which allows weather tight packaging and eliminates the need for mechanical switching parts.

Various types of switches have been utilized in the design of paging and portable radio products, but these have often presented problems due to normal wear of the moving parts usually associated with such switches. Furthermore, most mechanical switches are not sealed against the environment so the associated circuitry can be affected by moisture or dirt.

One known arrangement utilized in present-day pagers relies upon a mechanical movement that has a popple type of momentary contact. This popple switch relies upon movement of a deformable bubble directly above a pair of metal contacts. Another type of mechanical switch, utilized in radio pagers or the like utilizes slide switches which allow a circuit to be closed or opened such as in a switch utilized for on-off operation of the device. Both type of switches suffer the disadvantages of poor environment sealing and the susceptibility to wear during normal use.

Accordingly, there is a need for an improved switching system which allows a weather tight housing or package to be made having a plurality of switches without moving parts.

SUMMARY OF THE INVENTION

An object of the present invention is to provide a weather tight switching system with moving parts eliminated.

Broadly, one or more light sensors are secured in a housing to be selectively shielded thereby effectively sensing a decrease or absence of light after a predetermined delay as referenced to an average ambient light level to select one or more electrically controlled functions as needed in an electronic device such as a pager or portable radio.

In another aspect a switching system operated from switching areas in a housing of an electronic device includes first and second sets of ambient light sensors and switch sensing means secured in the housing. An ambient sensing circuit and averaging circuit means connects to the first set of light sensors to produce a reference signal representing an average ambient light reaching the first set. A shielding sensing circuit means couples to the second set of light sensors to produce a switch sensing signal in response to an operator shielding ambient light therefrom. A comparison means coupled to the averaging and shielding sensing circuit means compares the switch sensing signal and the reference signal to provide an output after a predetermined delay; and a switch connected to said comparison means performs at least one switching function in response to the output from the comparison means.

In a still further aspect of the invention, the plurality of light sensors connect to a multiplexer which in turn connects to an analog-to-digital converter. The A/D converter, in turn, couples to a comparison means having a controller therein and having an output coupled to one or more electronic switches. The multiplexer, analog-to-digital converter and controller can be altogether implemented as a microprocessor.

In yet another aspect of the invention, the plurality of light sensors coupled to an operational amplifier to produce a reference signal representing an average level of ambient light, and a plurality of comparators to produce a switch sensing signal in response to a shielding of ambient light from at least one switching area. A decision circuit including a logic gate array requiring both a minimum operating light equivalent voltage and a high switch sensing signal to be present provides an output to at least one electronic switch for performing at least one switching function in response to the output from the decision circuit.

DETAILED DESCRIPTION OF THE PREFERRED EMBODIMENT

Figure 1:
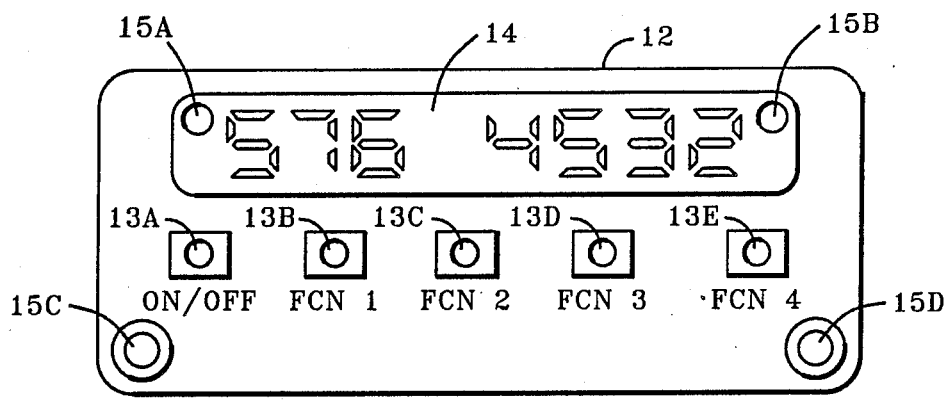
FIG. 1 is a simplified top view of a pager display and control panel having a plurality of switching areas.

FIG. 1 depicts a display and control panel 12 of a housing of an electronic device such as a radio pager. Switching areas include light pipes 13A-13E, while other light pipes 15A, 15D are arranged around the pager message display 14, for sensing ambient light. The switching areas labeled as 13A-13E inclusive, are normally exposed to ambient light except when an operator of the switching system selectively shields ambient light on one of the functions.

Figure 2:
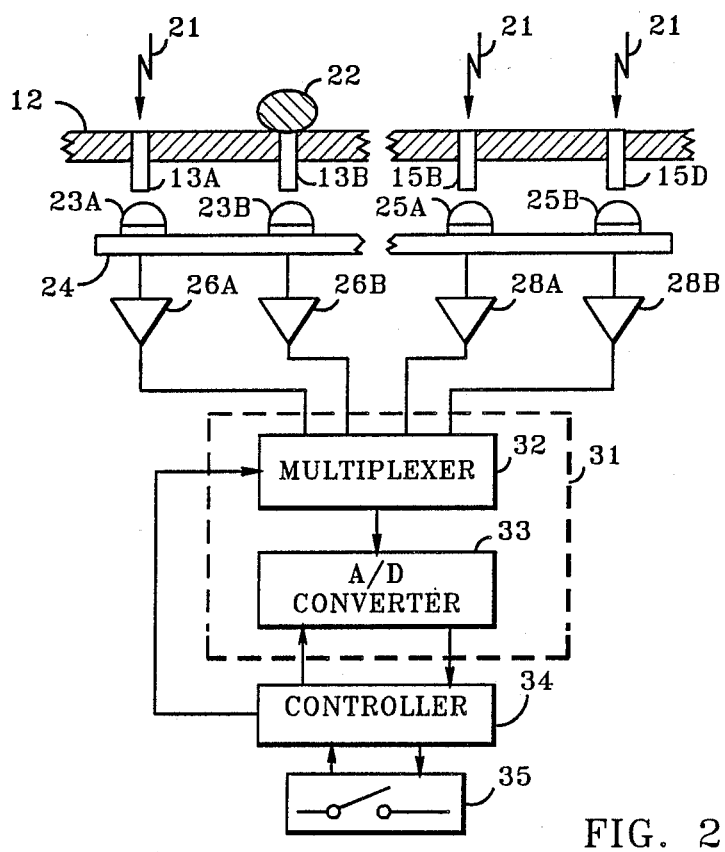
FIG. 2 is a partial cross-sectional view of a portion of the display and control panel of FIG. 1 plus a block diagram of the system circuitry.

In FIG. 2, one embodiment is shown implemented in digital form. Light pipes 13A, 13B, 15B, and 15D couple light, represented at 21, to light detectors commonly implemented as pin photodiodes 23A, 23B, 25A, and 25B mounted on P.C. board 24. An operator of the electronic device choosing to activate one of the switching functions within the device places a finger, represented by 22, upon one of the switching areas, thereby blocking the ambient light from reaching the switch sensor 23B. If the electrical signal from the light sensors or light detectors is too weak, additional amplifier stages 26A, 26B and 28A, 28B can be incorporated.

Circuit 31 takes the electrical signal from the light sensors or from the optionally included light sensor amplifiers, and couples it to an ambient sensing means and a shielding sensing means commonly implemented as a multiplexer 32 which serially scans each sensor according to an output from a controller 34 to provide a signal to analog-to-digital converter 33 for conversion to a digital signal according to a control output from controller 34. The ambient sensing means and the shielding means both couple to the same analog-to-digital conversion inside A/D converter 33. However, depending on whether the sensors of the ambient light or of the switches are selected by the multiplexer 32, the conversion is categorized as ambient sensing or shielding sensing, respectively. The digital signal is then fed to a comparison means and an averaging means commonly implemented as the controller 34 having one output that drives multiplexer 32 and another output which controls a switching circuit 35. The switching circuit has an output fed back to the controller to reset the switch as needed.

In operation, the controller 34 has the multiplexer 32 scan each of the light sensors and convert the sampled electrical signal to a digital signal into the analog-to-digital converter 33. The sequence of digital signals from converter 33 is then stored and compared in controller 34. The digital signals representing the ambient light level sensed by light sensors 15B and 15D are acted upon by controller 34 to determine an average level in order to set a switching threshold that is utilized to determine the proper switching operation of each of the switching areas having the switch sensing means 13A, 13B, 23A and 23B.

Thus, when an operator blocks or shields the ambient light from a desired light pipe, such as 13B, the absence of light, as represented by the decreased electrical signal caused by detecting a decreased level of light, is converted and presented to controller 34. Logically according to a sample flow diagram of FIG. 3, controller 34 then determines if the average light intensity is below the established switching threshold and if it exceeds a predetermined delay, such as ¼ second, the desired switching function is activated. Moreover, this predetermined delay can be easily adjusted by changing an instruction to controller 34 and can also be adjusted depending upon the average ambient light intensity.

Figure 3A:
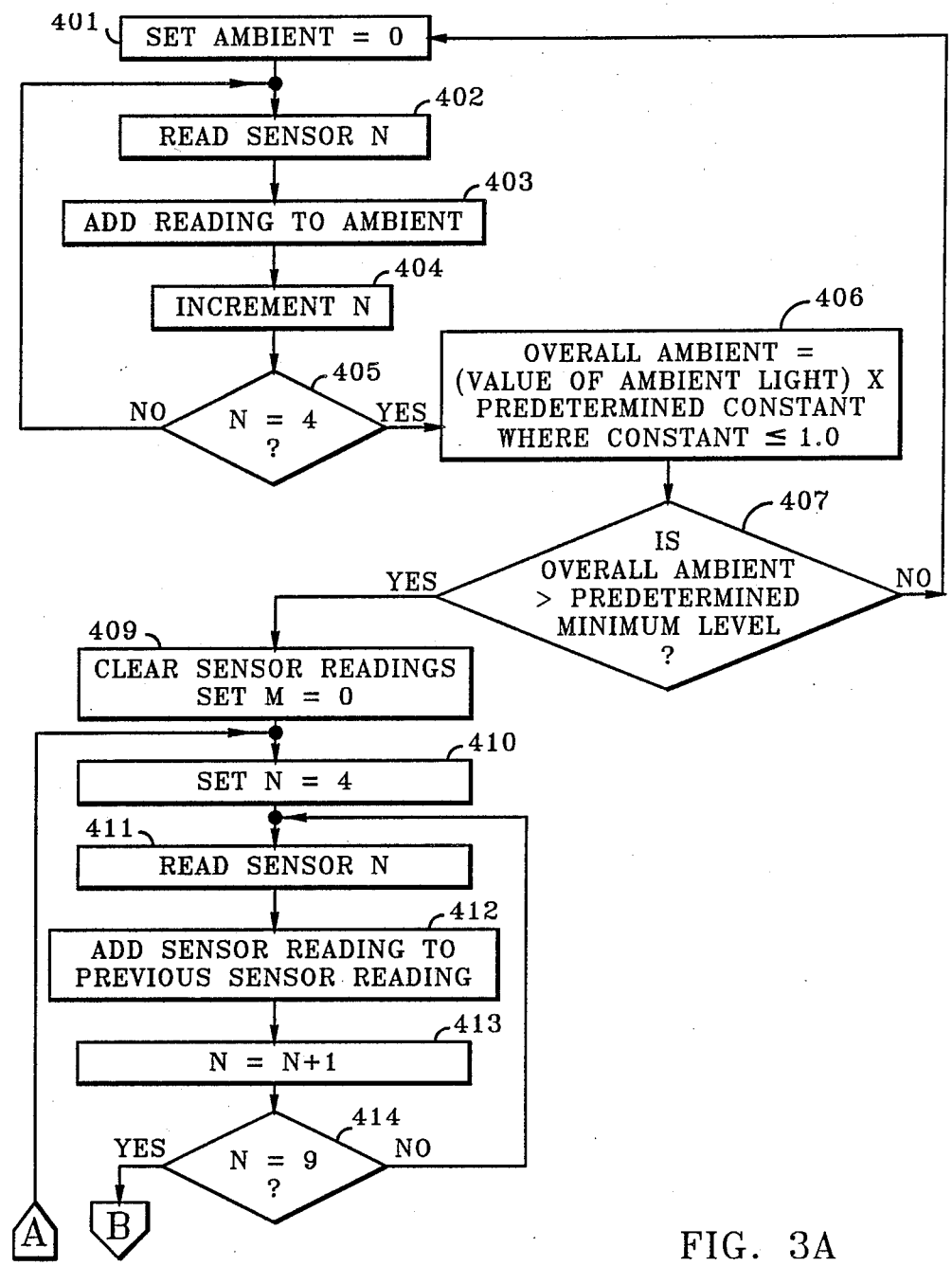
FIGS. 3A and 3B is a flow diagram detailing the operation of the controller of FIG. 2.
Figure 3B:
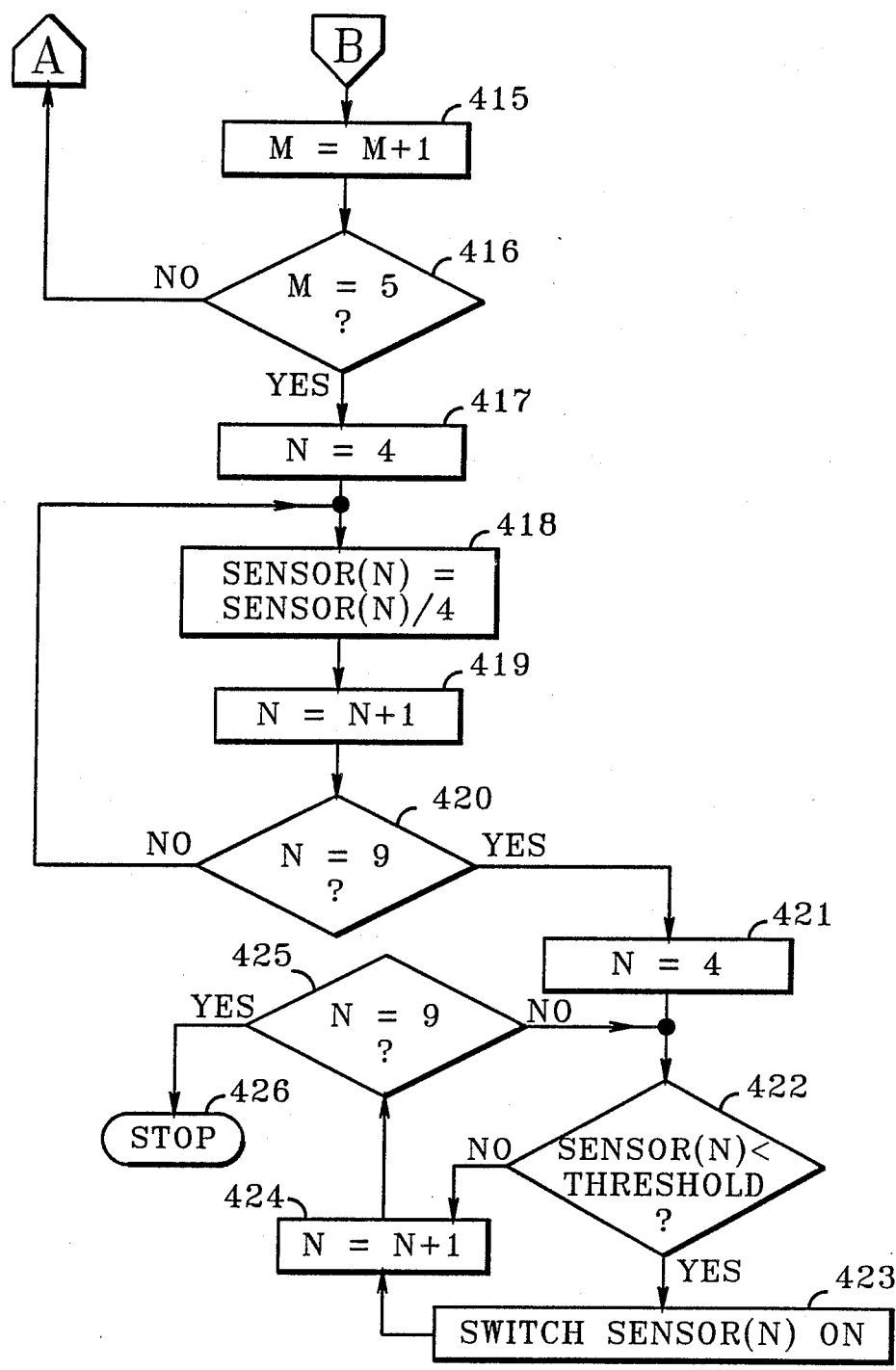

Referring now to FIG. 3 which is a flow diagram detailing the operation of the controller of FIG. 2, the first block 401 initializes the ambient light threshold to a value of zero. N being the sequence of sensors is also initialized to zero. Block 402 next reads sensor N. The sensor N light reading from block 402 is added to the threshold value in block 403. The next block 404 increments N to read the next light sensor. Assuming the first four sensors N=0, 1, 2, 3 measure the environmental ambient light forming the plurality of ambient light sensing means, the decision block 405 determines whether N is equal to 4 or not. If N does not equal to 4, meaning all four sensors have not been read for the environmental ambient light, the process returns to block 402 to read more sensors. If the four sensors have already been read, the accumulated threshold value of ambient light should have now been stored in memory from block 403. Block 406, the averaging means, retrieves this value to calculate the threshold value for the average ambient light. Decision block 407 then compares this average ambient value with a predetermined voltage equivalent of the lowest operational light level. If the ambient value is not greater than the predetermined level, then there is not enough ambient light for the process to continue and the process reinitializes.

If there is enough light, where the threshold value is greater than the predetermined level, the process continues to block 409 where all the switch sensor readings and a counter M are initialized to zero. Block 410 sets N equal to 4. This flow chart is assuming the switch sensing means where N equals 4, 5, 6, 7, and 8 are measuring the light impinging the switches. Sensor N is now read in block 411 and stored as such. Block 412 adds the current reading of this sensor to the previous readings of the same sensor. N is again incremented in block 413. Decision block 414 now decides whether the last sensor has been read or not. If N does not equal to 9, the process returns to block 411 to read the next sensor. However, if N equals to 9, counter M is incremented in block 415. Decision block 416 determines whether enough readings have been taken on each sensor. If M does not equal to 3, the process returns to block 410. Counter M can be compared to a different integer depending on the delay desired. If sufficient readings and delay have occurred, N is reset to 4 in block 417. Block 418 now computes the average reading for the current sensor by dividing the total readings by 4. Block 419 again increments N. Decision block 420 determines whether the average reading of each switch sensor has been computed. If N does not equal to 9, the process returns to block 418. If N equals to 9, N is reset to 4 in block 421.

Decision block 422, comparison means, next determines whether the average reading of sensor N is less than the average threshold value of the ambient light obtained before. If the reading of sensor N is less than the ambient light threshold, the switch corresponding to that sensor N is switched on in block 423 and that particular function is activated. If the reading of sensor N is not less than the threshold the process goes to block 424 where N is incremented to determine if the next sensor is below threshold. The process continues to decision block 425 to decide if there are anymore sensor switches to be compared. If N equals to 9, the process exits at block 426 since no switch sensor has been activated. However, if N does not equal to 9, the process returns to block 422.

Figure 4:
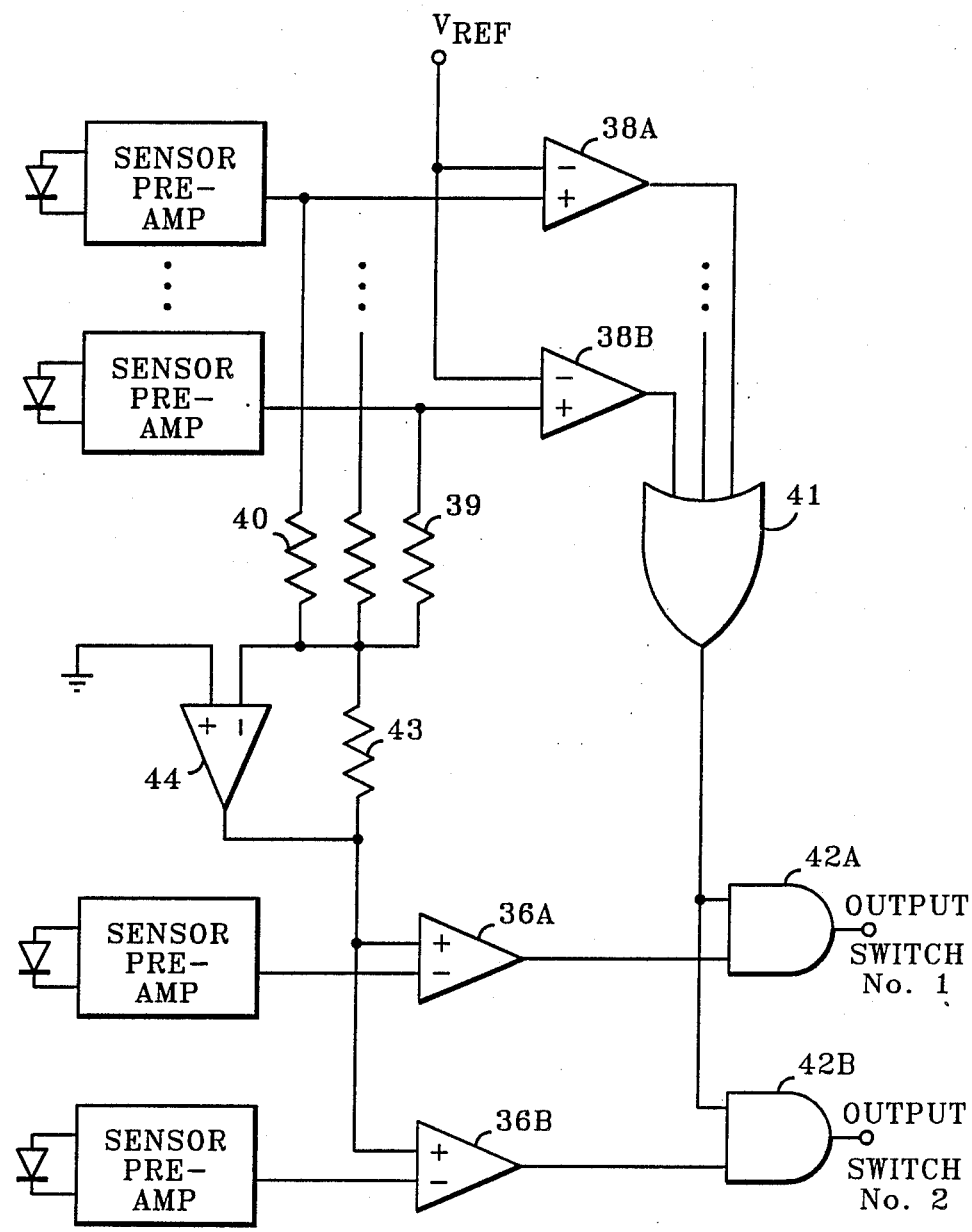
FIG. 4 is an electrical schematic diagram of an alternate embodiment of the present invention.

Although described so far in terms of a digital implementation using a CMOS microprocessor with ancillary multiplexer and analog-to-digital converters, the present invention may also be implemented in discrete form, as shown in FIG. 4. For simplification, as in FIG. 1, only two ambient sensors are described for sensing ambient light and two switch sensors for sensing the absence or decrease of light upon the switching areas. The outputs from the ambient light sensors are fed into the positive inputs of comparators 38A and 38B, whereas the outputs from the switch sensors are fed into the negative inputs of comparators 36A and 36B since a decrease of light is to be detected. An absolute reference voltage which is the voltage equivalent of the minimum operating light is fed into the negative input of comparators 38A and 38B as the reference voltage $V_{ref}$ for comparison against the outputs from the ambient sensors. The outputs of comparators 38A and 38B are "or"ed in OR gate 41 whose output serves as an input to AND gates 42A and 42B. A high on this input to the AND gates indicates that a sufficient level of ambient light is available for switch operations. The output from the first ambient light sensor is connected to the negative input of operational amplifier 44 via resistor 40. Similarly, the output from the second ambient light sensor is connected to the same point via resistor 39. Feedback resistor 43 along with operational amplifier 44 whose positive input is grounded serves as an ambient light level averaging circuit. The output from operational amplifier 44 now serves as the reference voltage to be compared against in the positive inputs of comparators 36A and 36B whose negative inputs are connected to the outputs from switch sensors. The outputs from comparators 36A and 36B are fed as the second inputs into AND gates 42A and 42B. The outputs from AND gates 42A and 42B will only activate a switch if there is a high output from comparators 36A or 36B where a decrease of light detected in the switch sensors along with a high ambient light output from OR gate 41.

Due to the use, for example, of highly sensitive PIN photodiodes as the plurality of light sensing means to establish the proper switching threshold for the further light sensing means coupled to the switching areas, the present invention allows proper switching operation inside an operator's pocket, or even in a darkened room such as a movie theater.

Moreover, the switching action can be made to function in places of extreme darkness if the light used to illuminate the display area 14 (FIG. 1) reflects off environmental objects of a sufficient level to exceed the lowest operational light level established by the plurality of light sensing means.

The illumination of the display 16 can be automatically activated by monitoring the squelch circuit or other selective signal decoding means, now shown, within the radio pager, so that illumination occurs upon receiving a message, and ceases at the conclusion of a message or when the squelch circuit mutes the audio output. This additional benefit would serve to save the operator from manually operating or turning on the illumination in such a dark environment.

What is claimed is:

1. A switching system comprising:
    a housing portion for an electronic device such as a radio,
    a plurality of ambient light sensing means secured in said housing portion to be exposed to ambient light,
    ambient sensing circuit means coupled to said plurality of ambient light sensing means to produce an ambient sensing signal in response to ambient light,
    averaging circuit means coupled to said light sensing means to produce a reference signal representing average ambient light reaching said plurality of ambient light sensing means,
    switch sensing means secured in said housing portion and positioned to be exposed to the ambient light and to be shielded from such ambient light by an operator of the switching system;
    shielding sensing circuit means coupled to said switch sensing means to produce a switch sensing signal in response to selectable light shielding,
    a comparison means coupled to said averaging circuit means and shielding sensing circuit means to respond after a predetermined delay to a comparison of the switch sensing signal and the reference signal and,
    a switching circuit coupled to said comparison means and responsive to the compared switch sensing and reference signals to perform a switching function.

2. A switching system as defined in claim 1, in which; the plurality of ambient light sensing means are photodiodes translating light levels into voltage levels for use by the ambient sensing means.

3. A switching system as defined in claim 1, in which; the plurality of ambient light sensing means are photodiodes translating light levels guided through light pipes into voltage levels for use by the ambient sensing circuit means.

4. A switching system as defined in claim 1, in which; the plurality of ambient light sensing means are photodiodes translating light levels guided through light pipes into voltage levels further amplified by amplifiers for use by the ambient sensing circuit means.

5. A switching system as defined in claim 1 in which; the switch sensing means are photodiodes translating light levels into voltage levels.

6. A switching system as defined in claim 1 in which; the switch sensing means are photodiodes translating light levels guided through light pipes into voltage levels for use by the shielding sensing circuit means.

7. A switching system as defined in claim 1, in which; the switch sensing means are photodiodes translating light levels guided through light pipes into voltage levels further amplified by amplifiers for use by the shielding sensing circuit means.

8. A switching system as defined in claim 1 in which; the ambient sensing circuit means, shielding sensing circuit means, averaging circuit means and comparison means are functions of a microprocessor which reads and compares voltage levels between the plurality of ambient light sensing means with the switch sensing means to select a switching circuit.

9. A switching system as defined in claim 1 in which; the averaging circuit means and comparison means are performed within a controller according to a software algorithm.

10. A switching system as defined in claim 1, in which; the ambient sensing circuit means is an analog-to-digital conversion of the plurality of ambient light sensing means selected by a multiplexer in an A/D converter.

11. A switching system as defined in claim 1, in which; shielding sensing circuit means is an analog-to-digital conversion of the switch sensing means in an A/D converter selected by a multiplexer.

12. A switching system as defined in claim 1, in which the ambient sensing circuit means are comparators comparing the voltage equivalent of the plurality of ambient light sensing means against a predetermined minimum operating light equivalent voltage.

13. A switching system as defined in claim 1, in which; the averaging circuit means is an operational amplifier generating a signal representing the average ambient light reaching said ambient sensing circuit means.

14. A switching system as defined in claim 1, in which; the shielding sensing circuit means are comparators comparing the switch sensing means against the averaging circuit means.

15. A switching system as defined in claim 1, in which: the comparison means is an AND gate activating the switching circuit only if the ambient sensing circuit means exceeds the predetermined minimum operating light equivalent voltage and the shielding sensing circuit means detects a decrease in light for a predetermined delay of time.

16. A switching system as defined in claim 1, in which: the comparison means will not operate if a predetermined minimum operating light equivalent voltage is not exceeded.

17. A switching system as defined in claim 1 in which; the comparison means can still operate if the minimum ambient voltage has not been detected by an automatic illumination of a housing light when necessary to exceed the predetermined minimum operating light equivalent voltage.

18. A switching system comprising:
    a housing portion for an electronic device such as a radio, a plurality of sensing means secured in said housing portion and positioned to be exposed to the ambient light and to be shielded from such ambient light by an operator of the switching system;

ambient sensing circuit means coupled to said plurality of sensing means to produce an ambient sensing signal in response to ambient light, averaging circuit means coupled to sensing means to produce a reference signal representing average ambient light reaching said plurality of sensing means, shielding sensing circuit means coupled to said sensing means to produce a switch sensing signal in response to selectable light shielding, a comparison means coupled to said averaging circuit means and shielding sensing circuit means to respond after a predetermined delay to a comparison of the switch sensing signal and the reference signal and, a switching circuit coupled to said comparison means and responsive to the compared switch sensing and reference signals to perform a switching function.

* * * * *